United States Patent [19]

Fujiwara et al.

[11] Patent Number: 4,941,636
[45] Date of Patent: Jul. 17, 1990

[54] LOCKING SLIDE APPARATUS FOR MOUNTING A SEAT

[75] Inventors: Mikio Fujiwara; Minoru Komohara, both of Ayase, Japan

[73] Assignee: Ikeda Bussan Company Ltd., Kanagawa, Japan

[21] Appl. No.: 384,401

[22] Filed: Jul. 24, 1989

[30] Foreign Application Priority Data

Sep. 16, 1988 [JP] Japan .................. 63-121231[U]

[51] Int. Cl.⁵ ............................................. A62B 35/60
[52] U.S. Cl. ..................................... 248/430; 248/419
[58] Field of Search .............. 248/430, 429, 420, 419, 248/393, 394

[56] References Cited

U.S. PATENT DOCUMENTS

| | | | |
|---|---|---|---|
| 3,381,927 | 5/1968 | Stamates | 248/429 |
| 4,089,500 | 5/1978 | Gustafsson | 248/429 |
| 4,804,229 | 2/1989 | Nishino | 248/430 X |

FOREIGN PATENT DOCUMENTS

| | | | |
|---|---|---|---|
| 858362 | 10/1952 | Fed. Rep. of Germany | 248/430 |
| 342901 | 8/1936 | Italy | 248/430 |
| 234003 | 5/1925 | United Kingdom | 248/429 |

Primary Examiner—Alvin C. Chin-Shue
Attorney, Agent, or Firm—Brooks & Kushman

[57] ABSTRACT

A locking slide apparatus (10) for mounting a seat in a vehicle, the locking slide apparatus including an elongated stationary rail (12) securable to a vehicle floor (11) and having a longitudinally aligned row of lock holes (18) extending vertically therethrough to form a linear rack, an elongated slide mechanism (13) adapted to support a seat thereon and supported by and longitudinally slidable along the stationary rail, and a lock mechanism (15) slidably attached to the slide mechanism and having lock pawls (19) upwardly insertable into and resiliently held in respective lock holes in the stationary rail to prevent the slide mechanism from sliding therealong.

4 Claims, 2 Drawing Sheets

LOCKING SLIDE APPARATUS FOR MOUNTING A SEAT

TECHNICAL FIELD

The present invention relates to a locking slide apparatus for mounting a seat in a vehicle.

BACKGROUND ART

Locking slide mechanisms used to mount a seat in a vehicle are well known in the art. Such mechanisms commonly include a seat-mounting slide mechanism slidably supported by an elonagted stationary rail securable to a vehicle floor. The stationary rail has vertical sides in each of which a longitudinally disposed row of lock holes are formed. A slide lock is supported by the slide mechanism and has lock pawls that extend laterally into respective lock holes to prevent the slide mechansim from sliding along the stationary rail, the lock pawls being withdrawn from the lock holes to free the slide mechanism for movement along the stationary rail.

The stationary rail is typically rectangular in cross section and has a longitudinal slot in its uppermost side. The slide mechanism includes rollers mounted on a portion thereof that extends downwardly through the slot to facilitate travel along the stationary rail. The rollers fit within the rectangular confines of the stationary rail and are guided thereby as the slide mechanism is longitudinally moved therealong.

Given the configuration just described, that is, one having slide mechanism and slide lock portions and rollers all disposed within the stationary rail, it is difficult to design a simple and adequate slide locking mechanism that will laterally insert lock pawls into lock holes located in the vertical sides of the stationary rail.

Accordingly, a locking slide mechanism was designed that typically, and as illustrated in FIGS. 4 and 5, comprises a slide mechanism 3, upon which a seat (not shown) is mountable, slidably supported on rollers 2 by a stationary rail 1 securable to a vehicle floor. The stationary rail has a substantially rectangular cross section and a longitudinal slot disposed in a substantial portion of its upper side. It also has a row of lock holes 5 extending through its lower side that are longitudinally spaced therealong and downwardly into which lock pawls extending from a slide lock 4 are resiliently urged by a spring. The slide lock is supported by the slide mechanism and is slidable with respect thereto, through a guide slot 3a, to allow the lock pawls to be inserted in respective lock holes in response to the spring and to be withdrawn from the lock holes in response to an upwardly directed disengaging force applied to the slide lock.

While the previously described locking slide mechanism functions with a certain degree of efficiency, a potentially serious disadvantage attends the design according to which slide-supported lock pawls are inserted downwardly into respective stop holes located in the lower side of the stationary rail. Depending on the configuration of the seat and numerous other factors, upon being subjected to certain forces as might be received, for example, as the result of a collision, the slide mechanism might, due to a lever action of an angled seat frame, be forced upwardly away from the stationary rail and, as a direct consequence, lift the lock pawls from the stop holes, allowing the slide mechanism and the seat to slide longitudinally. The present invention, as is hereinafter more fully described, has the advantage of directing similar forces received in a collision to more securely drive the lock pawls into their respective stop holes.

DISCLOSURE OF INVENTION

An object of the present invention is to provide a locking slide apparatus that will reliably withstand substantial collision forces without becoming disengaged and allowing a seat mounted thereon to move longitudinally.

Another object of the invention is to provide a locking slide apparatus that, when engaged, allows a minimum of longitudinal and lateral movement.

In carrying out the foregoing and other objects, the locking slide apparatus of this invention includes an elongated stationary rail that is securable to a vehicle floor. The stationary rail has a longitudinally aligned row of lock holes extending vertically therethrough to form a linear rack. An elongated slide mechanism, adapted to support a seat thereon, is supported by and longitudinally slidable along the stationary rail. Slidably attached to the slide mechanism is a lock mechanism having lock pawls upwardly insertable into, and resiliently held in, respective lock holes in the stationary rail to prevent the slide mechanism from sliding therealong.

The stationary rail includes an upper horizontal side, a lower horizontal side and two vertical sides defining a substantially rectangular cross section. The upper horizontal side has a slot longitudinally disposed therein that extends along at least a portion of the length thereof. The upper horizontal side also has a row of lock holes aligned parallel to and along at least one side of the slot.

The slide mechanism includes an elongated horizontal slide member having two vertical slide members depending therefrom along a substantial portion of a longitudinal border thereof. The horizontal slide member further has a guide piece extending vertically upward from the horizontal slide member, the guide piece being coplanar with and longitudinally spaced between the two vertical slide members. The vertical slide members extend downwardly from the horizontal slide member through the slot in the upper horizontal side of the stationary rail. Each of the vertical slide members supports a horizontally aligned shaft upon which is rotatably mounted a roller on each side of the vertical slide member. The rollers are disposed between the upper horizontal side and the lower horizontal side of the stationary rail.

The lock mechanism includes a slide lock having a substantially I-shaped cross section defined by a vertical web connected to and extending between a horizontal upper flange and a horizontal lower flange. The horizontal lower flange has one or more lock pawls upwardly and vertically disposed thereon distal from said web, and its lateral extremities support upwardly and vertically disposed lateral slide lock guides.

The means for biasing the lock pawls in an upward direction includes a substantially helical spring disposed between the upper flange of the slide lock and the horizontal slide member of the slide mechanism.

With the construction described by the foregoing, the slide lock can be forced in a downward direction to thereby withdraw the lock pawls from the lock holes in the stationary rail. With the lock pawls withdrawn, the slide mechanism and the attached seat can be longitudinally repositioned along the stationary rail. Once the seat is in a desired position, the slide lock can be released, allowing the spring to force the lock pawls into respective lock holes, thereby denying the slide mechanism any further travel along the stationary rail.

Once the lock pawls have been inserted into respective lock holes, inertial forces accompanying a collision and translated through an effective lever formed by an angled seat frame and slide mechanism will tend to force the lock pawls upward and into the lock holes, thereby reinforcing the engagement of the slide lock. Also, due to the configuration of the slide mechanism and the lock mechanism, the present invention provides an improved minimization of undesirable longitudinal and lateral movement thereof with respect to the stationary rail.

The objects, features and advantages of the present invention are readily apparent from the following detailed description of the best mode for carrying out the invention when considered in connection with the accompanying drawings thereof in which like reference characters indicate corresponding parts in all the views.

BEST MODE FOR CARRYING OUT THE INVENTION

Figure 1:
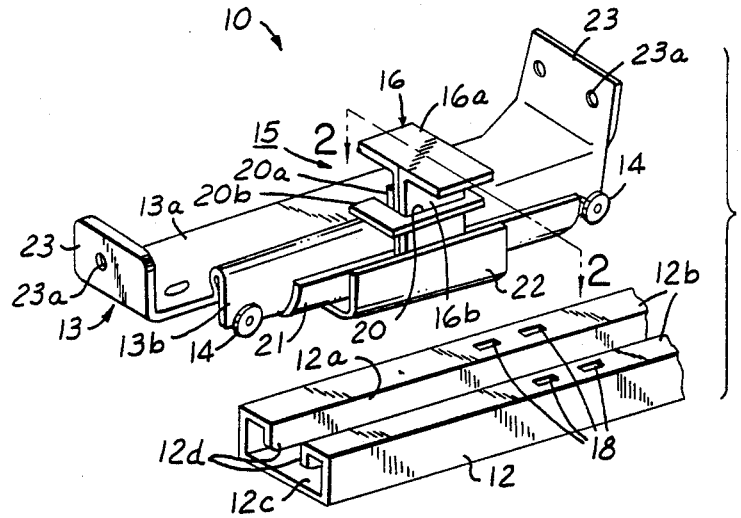
FIG. 1 is a perspective, exploded view illustrating the locking slide mechanism of the present invention.
Figure 2:
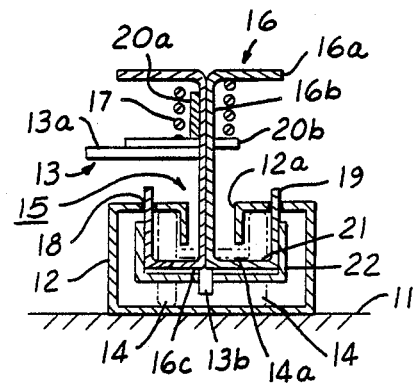
FIG. 2 is a sectional view taken along line 2—2 of FIG. 1.

With reference to FIG. 1 of the drawings, an improved locking slide apparatus constructed in accordance with the present invention is generally indicated by reference numeral 10. This locking slide apparatus 10 includes an elongated stationary rail 12 that is securable to a vehicle floor 11 (FIG. 2). The stationary rail 12 has a longitudinally aligned row of lock holes 18 extending vertically therethrough to form a linear rack. An elongated slide mechanism, generally indicated by reference numeral 13, adapted to support a seat (not shown) thereon, is supported by and longitudinally slidable along the stationary rail 12. Slidably attached to the slide mechanism 13 is a lock mechanism 15 having lock pawls 19 (FIG. 3) upwardly insertable into, and resiliently held in, respective lock holes 18 in the stationary rail 12 to prevent the slide mechanism 13 from sliding therealong.

The stationary rail 12 includes an upper horizontal side 12b, a lower horizontal side 12c and two vertical sides defining a substantially rectangular cross section. The upper horizontal side 12b has a slot 12a longitudinally disposed therein that extends along at least a portion of the length thereof. Depending from the upper horizontal side 12b and coextensive with each longitudinal border of the slot 12a is an elongated rail guide 12d. The upper horizontal side 12b also has a row of lock holes 18 aligned parallel to and along both sides of the slot 12a. As is well known by anyone skilled in the art, the upper horizontal side 12b, the lower horizontal side 12c, the two vertical sides and the two elongated rail guides 12d of the stationary rail 12 can be formed of one continuous piece of suitable material such as metal or plastic.

The slide mechanism 13 includes an elongated horizontal slide member 13a having two vertical slide members 13b depending therefrom along a substantial portion of a longitudinal border thereof. The horizontal slide member 13a further has a guide piece 20a extending vertically upward from the horizontal slide member 13a, the guide piece 20a being coplanar with and longitudinally spaced between the two vertical slide members 13b, there being a space 13c defined between the adjacent ends of the two vertical slide members 13b.

A guide plate 20b is secured to the horizontal slide member 13a. The guide plate 20b is substantially C-shaped and cooperates with the guide piece 20a to form a guide hole through which the lock mechanism 15 is guided. As is also well known by anyone skilled in the art, the horizontal slide member 13a, the two vertical slide members 13b and the guide piece 20a can be formed of one continuous piece of suitable material such as metal or plastic.

The vertical slide members 13b extend downwardly from the horizontal slide member 13a through the slot 12a in the upper horizontal side 12b of the stationary rail 12. Each of the vertical slide members 13b supports a laterally aligned shaft 14a upon which is rotatably mounted a roller 14 on each side of the vertical slide member 13b. The rollers 14 are disposed between the upper horizontal side 12b and the lower horizontal side 12c of the stationary rail 12, the rail guides 12d being disposed between the rollers 14.

The horizontal slide member 13a of the slide mechanism 13 also has brackets 23 extending upwardly therefrom. The brackets 23 have holes 23a extending therethrough to facilitate mounting, for example, with bolts, a seat (not shown) thereon, a typical seat including an angled frame upon which are mounted a seat support and a back support.

Figure 3:
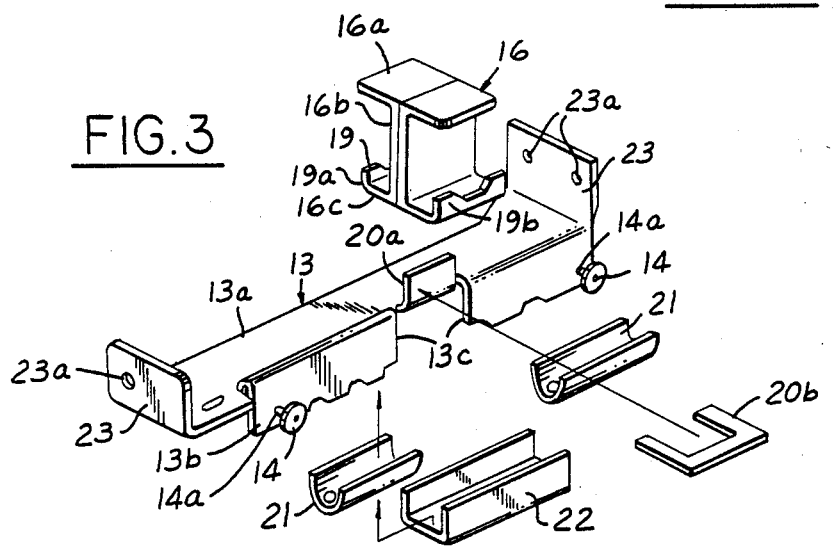
FIG. 3 is a perspective, exploded view illustrating parts included in the slide mechanism and the lock mechanism of the present invention.
Figure 4:
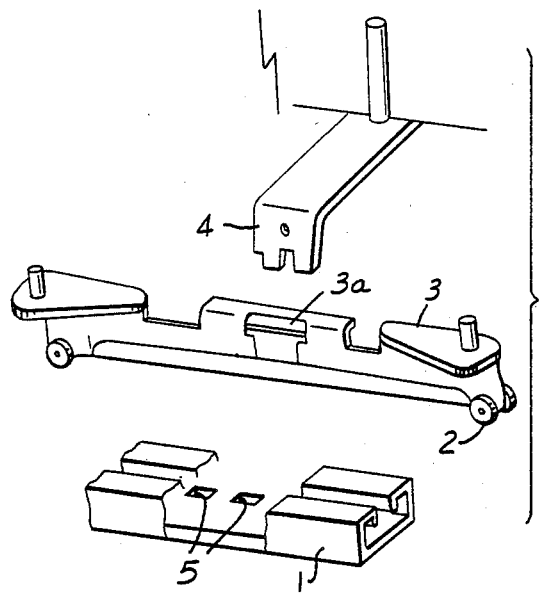
FIG. 4 is a persepctive, exploded view illustrating a prior art embodiment of a locking slide mechanism.
Figure 5:
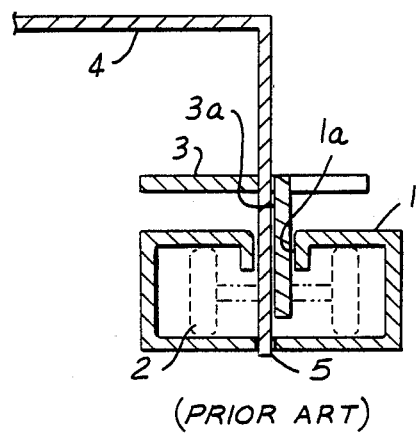
FIG. 5 is a central sectional view of the locking slide mechanism of FIG. 4.

The lock mechanism, generally indicated by reference numeral 15, includes a slide lock 16 having a substantially I-shaped cross section defined by a vertical web 16b connected to and extending between a horizontal upper flange 16a and a generally rectangularly shaped horizontal lower flange 16c (FIGS. 2 and 3). The horizontal lower flange 16c extends laterally through the space 13c defined between adjacent the ends of the vertical slide members 13b.

Each of the lateral borders of the horizontal lower flange 16c supports an upwardly and vertically disposed lateral slide lock guide 19a and 19b (FIG. 3). Formed proximate to, and extending upwardly and vertically from, each longitudinal end of each lateral slide lock guide 19a and 19b is a lock pawl 19 (FIGS. 2 and 3).

The means for biasing the lock pawls 19 in an upward direction includes a substantially helical compression spring 17 (FIG. 2) disposed between the upper flange 16a of the slide lock 16 and the horizontal slide member 13a of the slide mechanism 13 to resiliently urge the upper flange 16a upwardly away from the guide plate 20b, thereby urging the lock pawls 19 in an upward direction to facilitate their insertion and retention in respective lock holes 18 in the stationary rail 12.

Each of a pair of U-shaped side channels 21 is connected, along its internal nadir line, to one of the vertical slide members 13b, along its lower edge. A U-shaped central channel 22 envelops at least a portion of, and is connected to, each of said side channels 21 such that the lower flange 16c of the slide lock 16 is slidably enveloped within a central portion of the central channel 22 to minimize any lateral and angular movement of the slide lock 16. The disposition of the slide lock 16 between the two side channels 21 minimizes any longitudinal movement of the slide lock 16.

The slide lock 16 can be forced in a downward direction to thereby withdraw the lock pawls 19 from the lock holes 18 in the stationary rail 12. With the lock pawls 19 withdrawn, the slide mechanism 13 and the attached seat can be longitudinally repositioned along the stationary rail 12. Once the seat is in a desired position, the slide lock 16 can be released, allowing the spring 17 to force the lock pawls 19 into, and retain them in, respective lock holes 18, thereby denying the slide mechanism 13 any further travel along the stationary rail 12.

With the construction described by the foregoing, once the lock pawls 19 have been inserted int respective lock holes 18, inertial forces accompanying a collision and translated through the effective lever created by the angled seat frame and slide mechanism 13 will tend to force the lock pawls 19 upward and into the lock holes 18, thereby constructively reinforcing the engagement of the slide lock 16. Also, due to the configuration of the slide mechanism 13 and the lock mechanism 15, the present invention provides an improved minimization of undesirable longitudinal and lateral movement of the seat with respect to the stationary rail 12. Unwanted longitudinal movement of the lower flange 16c of the slide lock 16 is minimized by the restricting proximity of the side channels 21, and unwanted lateral movement is minimized by the restricting envelopment of the lower flange 16c by the central channel 22.

While the best mode for carrying out the invention has been described in detail, those familiar with the art to which this invention relates will recognize various alternative designs and embodiments for practicing the invention as disclosed by the following claims.

What is claimed is:

1. A locking-slide apparatus for mounting a seat in a vehicle, the locking slide apparatus comprising:
    an elongated stationary rail securable to a vehicle floor, said stationary rail having an upper horizontal side, a lower horizontal side and two vertical sides defining a substantially rectangular cross section, said upper horizontal side having a slot longitudinally disposed therein and extending along at least a portion of the length thereof, said upper horizontal side further having a row of lock holes extending vertically therethrough and along at least one side of the slot to form a linear rack;
    a slide mechanism supported by and longitudinally slidable along said stationary rail, said slide mechanism including an elongated horizontal slide member, said horizontal slide member having two vertical slide members depending therefrom along a substantial portion of a longitudinal border thereof, said horizontal slide member further having a guide piece extending vertically upward from said horizontal slide member, said guide piece being coplanar with and longitudinally spaced between said two vertical slide members, said vertical slide members extending downwardly from said horizontal slide member through said slot in said upper horizontal side of said stationary rail, each of said vertical slide members supporting a horizontally aligned shaft upon which is rotatably mounted a roller on each side of said vertical slide member, said rollers being rotatably disposed between said upper horizontal side and said lower horizontal side of said stationary rail, said slide mechanism being adapted to support the seat thereon;
    a lock mechanism having a vertical member supported by and vertically slidable along said slide mechanism, a horizontal lower flange connected to said vertical member, and at least one pawl connected to and extending vertically upward from said lower flange to inserted upwardly into a vertical lock hole in said upper horizontal side of said stationary rail to prevent said slide mechanism from sliding along said stationary rail;
    means for resiliently biasing said lock pawl in an upward direction to urge said lock pawl into a vertical lock hole in said upper horizontal side of said stationary rail; and
    a guide plate connected to said slide mechanism proximate said guide piece, said guide plate being substantially C-shaped to define, in cooperation with said guide piece, a guide hole through which said vertical member of said lock mechanism is slidably guided.

2. A locking slide apparatus for mounting a seat in a vehicle, the locking slide apparatus comprising:
    an elongated stationary rail securable to a vehicle floor, said stationary rail having an upper horizontal side, a lower horizontal side and two vertical sides defining a substantially rectangular cross section, said upper horizontal side having a slot longitudinally disposed therein and extending along at least a portion of the length thereof, said upper horizontal side further having a row of lock holes extending vertically therethrough and along both sides of the slot to form a linear rack;
    a slide mechanism supported by and longitudinally slidable along said stationary rail, said slide mechanism being adapted to support the seat thereon;
    a lock mechanism including a slide lock having a substantially I-shaped cross section defined by a vertical web connected to and extending between a horizontal upper flange and a horizontal lower flange, said horizontal lower flange having a plurality of lock pawls upwardly and vertically disposed thereon distal from said web, said lock pawls being spaced to be inserted in a respective plurality of lock holes in said upper horizontal side of said stationary rail, said vertical web being supported by and vertically slidable along said slide mechanism;
    a pair of side channels having substantially U-shaped cross sections, each of said side channels being connected, along its internal nadir line, to a respective one of said vertical slide members of said slide mechanism, along its lower edge; and
    a central channel having a substantially U-shaped across section, said central channel enveloping at least a portion of, and being connected to, each of said side channels, said lower flange of said slide lock being slidable enveloped within a central portion of said central channel to minimize any lateral and angular movement of said slide lock and being disposed between said side channels to minimize any longitudinal movement of said slide lock.

3. A locking slide apparatus according to claim 2, further including a lateral slide lock guide disposed on and extending vertically and upwardly from each lateral border of said lower flange of said slide lock.

4. A locking slide apparatus according to claim 3, wherein said lock pawls are disposed proximate to, and extend upwardly and vertically from, each longitudinal end of each lateral slide lock guide.

* * * * *